United States Patent
Gupta et al.

(10) Patent No.: US 10,931,483 B2
(45) Date of Patent: Feb. 23, 2021

(54) DEVICE-TO-DEVICE (D2D) COMMUNICATION MANAGEMENT TECHNIQUES

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/014,799

(22) Filed: Jun. 21, 2018

(65) Prior Publication Data
US 2019/0141694 A1    May 9, 2019

Related U.S. Application Data

(60) Provisional application No. 62/581,995, filed on Nov. 6, 2017, provisional application No. 62/584,265, filed on Nov. 10, 2017.

(51) Int. Cl.
*H04W 72/04*  (2009.01)
*H04W 72/12*  (2009.01)
(Continued)

(52) U.S. Cl.
CPC ............ *H04L 25/0224* (2013.01); *H04L 5/00* (2013.01); *H04L 5/005* (2013.01); *H04W 4/70* (2018.02);
(Continued)

(58) Field of Classification Search
CPC ....... H04L 25/0224; H04L 5/00; H04L 5/005; H04W 4/70; H04W 76/14; H04W 36/03;
(Continued)

(56) References Cited

U.S. PATENT DOCUMENTS

2013/0235823 A1   9/2013  Kneckt
2013/0322276 A1   12/2013 Pelletier et al.
(Continued)

FOREIGN PATENT DOCUMENTS

EP   3506538 A1        7/2019
WO   WO-2017165405 A2  9/2017
WO   WO-2018054191 A1  3/2018

OTHER PUBLICATIONS

International Search Report and Written Opinion—PCT/US2019/037796—ISA/EPO—dated Aug. 21, 2019.

*Primary Examiner* — Paul H Masur
*Assistant Examiner* — Ellen A Kirillova
(74) *Attorney, Agent, or Firm* — Qualcomm Incorporated

(57) ABSTRACT

Methods and apparatuses are provided which may be used in a base station and/or user equipment (UE) to support or otherwise provide device-to-device (D2D) communication in a shared radio frequency spectrum between candidate UEs. For example, a base station may determine that a first UE and a second UE are candidates for D2D communication, and provide and indicate that a Grant-free Uplink (GUL) resource allocation for D2D communication between the first and second UEs. The base station may further monitor the D2D communication.

25 Claims, 8 Drawing Sheets

(51) Int. Cl.

| | | |
|---|---|---|
| *H04W 72/08* | (2009.01) | |
| *H04W 36/00* | (2009.01) | |
| *H04L 25/02* | (2006.01) | |
| *H04W 74/08* | (2009.01) | |
| *H04W 4/70* | (2018.01) | |
| *H04L 5/00* | (2006.01) | |
| *H04W 24/10* | (2009.01) | |
| *H04W 76/14* | (2018.01) | |
| *H04W 8/00* | (2009.01) | |
| *H04W 88/06* | (2009.01) | |
| *H04W 48/16* | (2009.01) | |

(52) U.S. Cl.
CPC ........... *H04W 24/10* (2013.01); *H04W 36/03* (2018.08); *H04W 72/048* (2013.01); *H04W 72/0413* (2013.01); *H04W 72/085* (2013.01); *H04W 72/1215* (2013.01); *H04W 72/1268* (2013.01); *H04W 74/0808* (2013.01); *H04W 76/14* (2018.02); *H04W 8/005* (2013.01); *H04W 48/16* (2013.01); *H04W 72/0406* (2013.01); *H04W 88/06* (2013.01)

(58) Field of Classification Search
CPC ............. H04W 24/10; H04W 72/0413; H04W 72/048; H04W 72/085; H04W 72/1215; H04W 72/1268; H04W 74/0808
USPC ........................................................ 370/331
See application file for complete search history.

(56) References Cited

U.S. PATENT DOCUMENTS

| | | | |
|---|---|---|---|
| 2013/0336230 A1 | 12/2013 | Zou et al. | |
| 2014/0003262 A1 | 1/2014 | He et al. | |
| 2014/0185587 A1 | 7/2014 | Jang et al. | |
| 2015/0003263 A1 | 1/2015 | Senarath et al. | |
| 2015/0078279 A1 | 3/2015 | Ko et al. | |
| 2016/0219528 A1 | 7/2016 | Kawasaki | |
| 2017/0230972 A1 | 8/2017 | Wang et al. | |
| 2017/0257898 A1* | 9/2017 | Maaref .................... | H04W 4/08 |
| 2017/0339530 A1* | 11/2017 | Maaref ................. | H04L 5/0033 |
| 2019/0104512 A1* | 4/2019 | Vura ..................... | H04W 72/02 |
| 2019/0140864 A1 | 5/2019 | Gupta et al. | |

* cited by examiner

DEVICE-TO-DEVICE (D2D) COMMUNICATION MANAGEMENT TECHNIQUES

PRIORITY CLAIMS

This application claims priority to and the benefit of U.S. Provisional Patent Application No. 62/581,995 filed in the United States Patent and Trademark Office on Nov. 6, 2017, the entire content of which is incorporated herein by reference as is fully set forth below in its entirety and for all applicable purposes.

This application further claims priority to and the benefit of U.S. Provisional Patent Application No. 62/584,265 filed in the United States Patent and Trademark Office on Nov. 10, 2017, the entire content of which is incorporated herein by reference as is fully set forth below in its entirety and for all applicable purposes.

RELATED APPLICATIONS

This application is related to U.S. patent application Ser. No. 16/014,777 filed (concurrently) in the United States Patent and Trademark Office on Jun. 21, 2018, the entire content of which is incorporated herein by reference as is fully set forth below in its entirety and for all applicable purposes.

BACKGROUND

Field of the Disclosure

The following relates generally to wireless communication, and more specifically to techniques for use in supporting or otherwise managing device-to-device (D2D) communication, and more particularly to techniques for potential use in D2D communication via grant-free uplink (GUL) resources in a shared radio frequency spectrum.

Description of Related Art

Wireless communications systems are widely deployed to provide various types of communication content such as voice, video, packet data, messaging, broadcast, and so on. These systems may support communication with multiple users by sharing the available system resources (e.g., broadcast spectrum with regard to time, frequency, spatial, and/or power related aspects). Examples of some multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include several base stations or network access nodes, each supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

For example, 5G NR may provide more flexibility in wireless communications. This increased flexibility may apply to different aspects of wireless communications, including the various mechanisms and techniques used for scheduling or conveying (e.g., signaling) information about assignments and/or feedback of transmissions. Accordingly, there is a need for new techniques for potential device-to-device (D2D) communication, particularly, using, at least in part, grant-free uplink (GUL) resources in a shared radio frequency spectrum.

SUMMARY

The described techniques relate to improved methods, systems, devices, or apparatuses that may be used in support of D2D communication, possibly using, at least in part, GUL resources in a shared radio frequency spectrum.

In accordance with certain example aspects of the present disclosure, a method may be provided for use at a first UE. The method may comprise, at the first UE, receiving an indication that a GUL resource allocation has been or will be provided for D2D communication between the first UE and a second UE. The indication may be transmitted, for example, by a base station. The method may further comprise, at the first UE, supporting the D2D communication, at least in part, by transmitting a first signal intended for the second UE via at least a first portion of the GUL resource allocation, and receiving a second signal from the second UE via at least a second portion of the GUL resource allocation.

In accordance with certain other example aspects of the present disclosure, a first UE may be provided which includes a receiver, a transmitter and a processing unit. The processing unit may be coupled to the receiver and the transmitter and configured to obtain an indication that a GUL resource allocation has been or will be provided for D2D communication between the first UE and a second UE. The indication may be transmitted, for example, by a base station and received by the first UE via the receiver. The processing unit may be further configured to support of the D2D communication, for example, by initiating transmission, via the transmitter, of a first signal intended for the second UE via at least a first portion of the GUL resource allocation, and obtaining, via the receiver, a second signal from the second UE via at least a second portion of the GUL resource allocation.

In accordance with yet other example aspects of the present disclosure, a method may be provided for use at base station. The method may comprise, at the base station determining that a GUL resource allocation is to be provided for D2D communication between a first UE and a second UE, and transmitting at least one indication to the first UE, the second UE, or both, wherein the at least one indication identifies at least a portion of the GUL resource allocation for use by the first UE, the second UE, or both in supporting the D2D communication therebetween.

In accordance with some other example aspects of the present disclosure, a base station may be provided which includes a receiver, a transmitter and a processing unit. The processing unit may be coupled to the receiver and the transmitter and configured to determine that a GUL resource allocation is to be provided for D2D communication between a first UE and a second UE, and initiate transmission, via the transmitter, of at least one indication to the first UE, the second UE, or both, wherein the at least one indication identifies at least a portion of the GUL resource allocation for use by the first UE, the second UE, or both in supporting the D2D communication therebetween.

DETAILED DESCRIPTION

Figure 1:
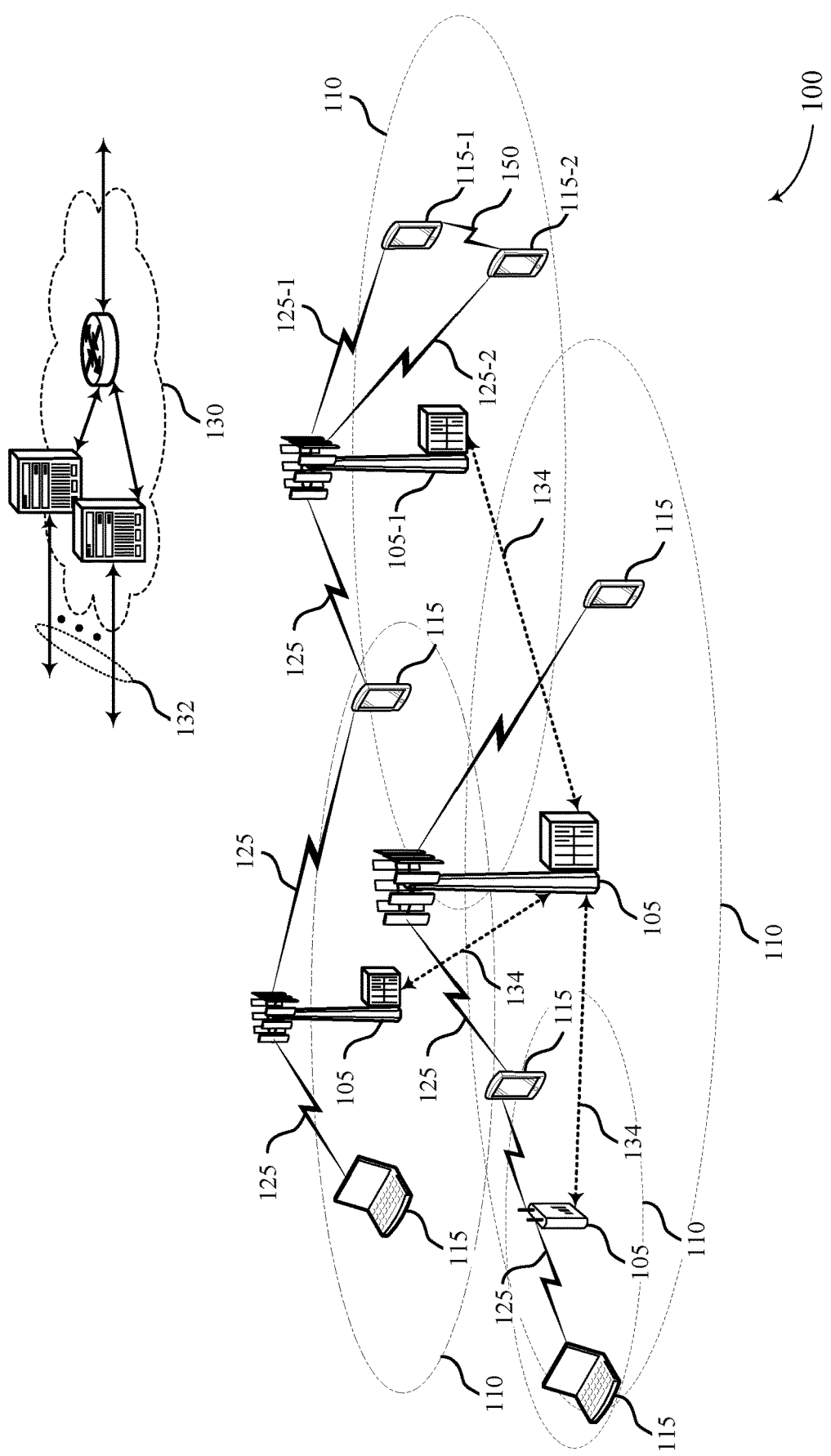
FIG. 1 illustrates an example of a system for wireless communication that may support D2D channel measurements and/or D2D communication, in accordance with certain aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In cellular communication networks, wireless devices may generally communicate with each other via one or more network entities such as a base station or scheduling entity. Some networks may additionally or alternatively support D2D communication that enables discovery of, and communication with nearby devices using a direct link between devices (e.g., without necessarily passing messages through a base station, relay, or other node). D2D communication may, for example, enable mesh networks and device-to-network relay functionality. Some examples of D2D technology include Bluetooth pairing, Wi-Fi Direct, Miracast, and LTE-D. D2D communication may also be called point-to-point (P2P) or sidelink communication.

D2D communication may be implemented using licensed or unlicensed bands. D2D communication may avoid the overhead involving the routing to and from the base station. Therefore, D2D communication may, in certain instances, provide better throughput, lower latency, and/or higher energy efficiency. MuLTEfire is a form of Long-term Evolution (LTE) network that may support D2D communication using unlicensed frequency bands. MuLTEfire may be used in any unlicensed spectrum where there is contention for use of the spectrum, although deployments are initially expected in the 5 GHz unlicensed band and potentially also in the 3.5 GHz shared band in the United States of America. MuLTEfire implements a listen-before-talk (LBT) strategy for coexistence management. For example, when a UE is accessing a channel in a MuLTEfire communication system, the UE may perform a first LBT process (e.g., 25 μs) if within the base station TxOP. A UE may perform a second LBT process (e.g., Cat. 4 LBT with random backoff) if not within the base station TxOP. Further, a UE may be configured to start an LBT process at different starting positions/times to reduce collisions between one or more other UEs.

Aspects of the present disclosure provide methods and apparatuses for supporting (e.g., initiating, managing, monitoring, ending, etc.) D2D communication, and in particular examples, making use, at least in part, of grant-free uplink (GUL) resources in a shared radio frequency spectrum. When a UE transmits data without first requesting a grant of certain network resources from a base station or scheduling entity, such data transmission may be called grant-less or grant-free traffic. In some wireless communication systems, base stations may coordinate with each other in allocating GUL resources for a D2D connection or channel between UEs across the cells. A base station may provide GUL resource allocation (e.g., indications of activation/release, etc.) messages to a UE. In certain implementations, such GUL resource allocation messages may be transmitted in a semi-persistent scheduling manner. A UE may, by way of example, monitor such messages as part of the downlink control information (DCI).

In a wireless communication system that may use a shared radio frequency spectrum, GUL transmissions may be implemented in addition to grant-based uplink transmission (e.g., DCI). A network entity (e.g., a base station) may allocate GUL resources to one or more UEs, e.g., for D2D communication. For example, a first UE may utilize a GUL resource allocation for D2D communication with a second UE in a shared radio frequency spectrum. D2D communication in a shared radio frequency spectrum may be implemented in a more centralized control mode that may include more monitoring/assistance of the base station than might otherwise be the situation in a distributed control mode wherein UEs may be configured to have more control over D2D communication.

Techniques are described in which a shared radio frequency spectrum is used for at least a portion of communications in a wireless communication system. In some examples, the shared radio frequency spectrum may be used for Long Term Evolution (LTE) or LTE-Advanced (LTE-A)

communications, Licensed Assisted Access (LAA) communications, enhanced LAA (eLAA) communications, or MuLTEfire communications. The shared radio frequency spectrum may be used in combination with, or independent from, a dedicated radio frequency spectrum. The dedicated radio frequency spectrum may include a radio frequency spectrum licensed to particular users/devices for particular purposes. The shared radio frequency spectrum may include a radio frequency spectrum available for Wi-Fi use, a radio frequency spectrum available for use by different radio access technologies, a radio frequency spectrum available for use by multiple mobile network operators (MNOs) in an equally shared or prioritized manner, or the like.

With this background in mind, as described in greater detail herein, in certain example implementations, a base station may be configured to determine that a GUL resource allocation is to be provided for use in D2D communication between a first UE and a second UE. By way an example, a GUL resource allocation may be provided as part of a MuLTEfire framework and/or the like. A base station, having made such a determination, may transmit one or more indications to the first UE, and the second UE that identify all or applicable portions of the GUL resource allocation for use by the first UE, the second UE, or both in supporting the D2D communication therebetween.

By way of an example, a base station may identify that a first UE and a second UE are D2D communication candidates based, at least in part, on one or more messages received from the first UE and/or the second UE indicating, e.g., estimated locations, ranges, etc. In another example, a base station may receive one or more requests for a D2D communication from the first UE, the second UE or both, and determine that a D2D communication may be provided based, at least in part, on one or more such requests. In certain instances, a base station may identify that such a D2D communication may be provided based on other received information. For example, a base station may monitor/measure channel conditions, consider resource allocations, etc., that may, at least in part, inform a D2D communication determination.

In certain instances, once having initiated a D2D communication, a base station be configured to monitor the D2D communication in some manner. For example, a base station may monitor a D2D communication by receiving a first signal via at least a first portion of the GUL resource allocation and/or a second signal via at least a second portion of the GUL resource allocation, wherein the first signal is transmitted from the first UE to the second UE and the second signal is transmitted by the second UE to the first UE as part of the D2D communication. Here, in certain instances, a first portion of such GUL resource allocation and a second portion of such GUL resource allocation may comprise the same GUL resource allocation, or different GUL resource allocations. In some implementations, a first or second portion of the GUL resource allocation may comprise at least a portion of a previous GUL resource allocation provided for the first or second UE (respectively), e.g., to transmit certain (possibly non-D2D communication) signals intended primarily for the base station. In certain implementations, a base station may monitor a D2D communication by monitoring traffic signals, ACK/NACK (HARQ, etc.), "keep-alive" signals, etc., transmitted using the GUL resource allocation of the D2D communication.

A base station may, for example, be configured to end a D2D communication, e.g., by changing the GUL resource allocation, informing the UEs, etc. By way of some examples, a base station may decide to end a D2D communication based, at least in part, on one or more D2D channel measurement threshold parameters, one or more UE Sounding Reference Signal (SRS) threshold parameters, one or more D2D communication time-out threshold parameters, one or more D2D communication termination requests, a base station handover determination, a GUL resource reallocation determination, or some combination thereof or the like.

To support a D2D communication, a first UE and a second UE may together or independently receive one or more indications that a GUL resource allocation has been or will be provided for D2D communication between the first UE and the second UE. In response to one or more such applicable indications, for example, the first UE may support the D2D communication by transmitting a first signal intended for the second UE via at least a first portion of the GUL resource allocation, and receiving a second signal from the second UE via at least a second portion of the GUL resource allocation. Similarly, for example, the second UE may support the D2D communication by transmitting the second signal intended for the first UE via at least the second portion of the GUL resource allocation, and receiving the first signal from the first UE via at least the first portion of the GUL resource allocation.

As mentioned, in certain implementations, the first UE, the second UE or both, may be configured to transmit request(s) for a D2D communication to the base station. For example, a first UE may be configured to determine a D2D channel measurement of a SRS transmission by the second UE, and determine whether to transmit a request to the base station based, at least in part, on the D2D channel measurement. Also, in certain implementations, to support a D2D communication the first UE, the second UE or both, may be configured to transmit traffic, SRS, "keep-alive" signals, or the like, e.g., that may be of use by the base station in monitoring and maintaining of the D2D communication.

D2D communications may allow one of the UEs to communicate directly with the another one of the UEs, which may increase throughput, reduce latency, extend range (coverage area), promote energy efficiency, or some combination thereof, just to name a few non-limiting examples. Hence, D2D communications may be of potential benefit to various social applications, e.g., gaming, media sharing, location-based services, and/or the like. In another example, such D2D communications may be of potential benefit with regard to wearable or other like devices that may be co-located, e.g., smart phones, smart watches, smart glasses, ear pieces, head sets, etc., particularly for data intensive communications, such as, media streaming, augmented reality, virtual reality, etc. In yet another potential example, such D2D communications may be of potential benefit to Internet-of-Things (IoT) devices or the like, some or all of which may benefit by saving battery or other like stored/available electrical power.

Accordingly, those skilled in the art will recognize that the D2D channel measurement techniques provided herein by example may be of benefit for a variety of different or same/similar types of UEs. Thus, for example, in certain implementations some UEs may comprise smart phones, tablets, laptops, positioning/tracking devices, wearable devices, display/glasses devices, vehicles, machines, appliances robots, drones, Internet-of-Things (IoT) devices, circuitry (e.g., controllers, sensors, actuators, data storage, etc.), and/or the like or some combination thereof. Although examples are illustrated with two UEs, in certain instances the techniques provided herein may be implemented to support D2D communications between more than two UEs.

The present description includes some example D2D communication techniques illustrated as possibly being implemented with regard to an example framework (e.g., MuLTEfire 1.1) or other like configured devices/networks. Nonetheless, it should be understood that, unless specifically recited, claimed subject matter is not intended to so limited, as those of skill in the art should recognize following review of the present description and drawings that such example techniques may be implementable in other types of frameworks/protocols, networks, signals, etc.

Attention is now drawn to FIG. 1, which illustrates an example of a wireless communications system 100 that supports D2D communication, e.g., using, at least in part, GUL resources in a shared radio frequency spectrum in accordance with various aspects of the present disclosure. Wireless communications system 100 may include, for example, base stations 105, UEs 115, and a core network 130. In some examples, wireless communications system 100 may comprise a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, communications with low-cost and low-complexity devices, etc.

In some examples, wireless communication network 100 may comprise one or any combination of communication technologies, including a new radio (NR) or 5G technology, LTE, LTE-A, MuLTEfire technology, a Wi-Fi technology, a Bluetooth technology, or any other long or short range wireless communication technology/framework. In LTE/LTE-A/MuLTEfire networks, the term evolved node B (eNB) may be generally used to describe the base stations 105, while the term UE may be generally used to describe the UEs 115. Wireless communication network 100 may be a heterogeneous technology network in which different types of eNBs provide coverage for various geographical regions. For example, an eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

As illustrated in FIG. 1, a base station 105 may be associated with a geographic coverage area 110 in which communications with various UEs 115 is supported. A base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station or by different base stations. The wireless communications system 100 may include, for example, a heterogeneous LTE/LTE-A or NR network in which different types of base stations provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and such UEs may, at times, be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, a UE 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P), a device-to-device (D2D) protocol, or the like). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling/allocation of resources for D2D communications. In other cases, some D2D communications may be carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

A core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Some of the network devices, such as a base station 105, may include subcomponents such as an access network entity, which may be an example of an access node controller (ANC). An access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed/shared radio frequency spectrum bands. For example, wireless communications system 100 may employ LTE License Assisted Access (LTE-LAA) or LTE-Unlicensed (LTE-U) radio access technology or MuLTEfire radio access technology or NR technology in an unlicensed/shared radio frequency band such as the 5 GHz ISM band. When operating in unlicensed/shared radio frequency spectrum bands, wireless devices such as base stations 105 and UEs 115 may employ listen-before-talk (LBT) procedures to ensure a frequency channel is clear before transmitting data. In some cases, operations in unlicensed/shared radio frequency bands may be based on a CA configuration in conjunction with CCs operating in a licensed band. Operations in unlicensed/shared radio frequency spectrum may include downlink transmissions, uplink transmissions, peer-to-peer transmissions, or a combination of these. Duplexing in unlicensed/shared radio frequency spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds ($T_f = 307200 * T_s$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and, in some instances, a symbol of a mini-slot or a mini-slot may be the smallest unit of scheduling. Each symbol may vary in duration depending on the sub-carrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that may support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed/shared radio frequency spectrum or shared radio frequency spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed/shared radio frequency spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In various aspects, as further illustrated in FIG. 1, a first UE 115-1 may be configured to support D2D communication with a second UE 115-2. Here, for example, a D2D communication is represented by communication link 150. UE 115-1 may be requested by base station 105-1 over communication link 125-1 to monitor an SRS transmission from UE 115-2 represented by communication link 125-2. For example, in certain implementations, base station 105-1 may determine that UE 115-1 and UE 115-2 may be indicated as being within a threshold communication proximity of one another, e.g., based on serving node activity, location information, etc. In certain instances, UE 115-2 may be instructed (e.g., by base station 105-1) to transmit one or more particular SRS that may be monitored by UE 115-1. In a similar manner, UE 115-2 may monitor one or more SRS transmission from UE-115-1. In this manner, UEs may make D2D channel measurement(s) and transmit corresponding reports to base station 105-1. Base station 105-1, having identified UE 115-1 and UE 115-2 as D2D communication candidates may set-up D2D communication therebetween and monitor the D2D communication, at least in part, using the example techniques provided herein.

Figure 2:
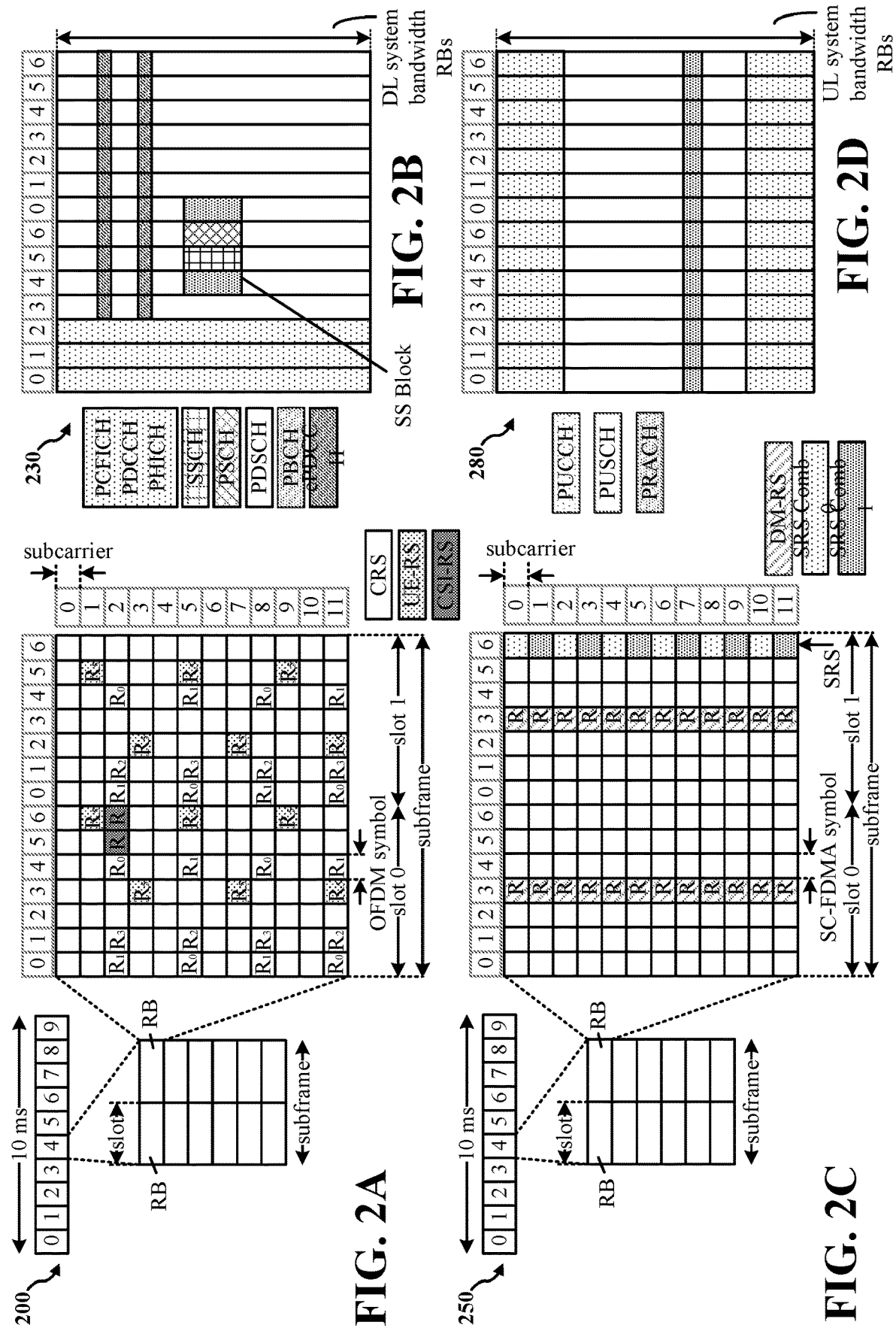
FIGS. 2A, 2B, 2C, and 2D are diagrams illustrating examples of a downlink DL frame structure, DL channels within the DL frame structure, an uplink UL frame structure, and UL channels within the UL frame structure that may be measurable or otherwise of potential use in support of D2D channel measurements and/or D2D communication, for example as in the system illustrated in FIG. 1, in accordance with certain aspects of the present disclosure.

FIG. 2A is a diagram 200 illustrating an example frame structure of one or more downlink (DL) frames in accordance with various aspects of the present disclosure. FIG. 2B is a diagram 230 illustrating an example of channels within the frame structure of a DL frame in accordance with various aspects of the present disclosure. FIG. 2C is a diagram 250 illustrating an example frame structure of one or more uplink (UL) frames in accordance with various aspects of the present disclosure. FIG. 2D is a diagram 280 illustrating an example of channels within the frame structure of a UL frame in accordance with various aspects of the present disclosure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers (e.g., for 15 kHz subcarrier spacing) in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (e.g., also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. As described in greater detail herein, in certain implementations, SRS transmissions may be measured by receiving UEs to determine D2D channel measurements. A SRS may have a comb structure, and a UE may transmit SRS on one of the combs. A SRS may be used by a base station for channel quality estimation to enable frequency-dependent scheduling on the UL.

FIG. 2D illustrates an example of various channels within an UL subframe of a frame. A physical random-access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
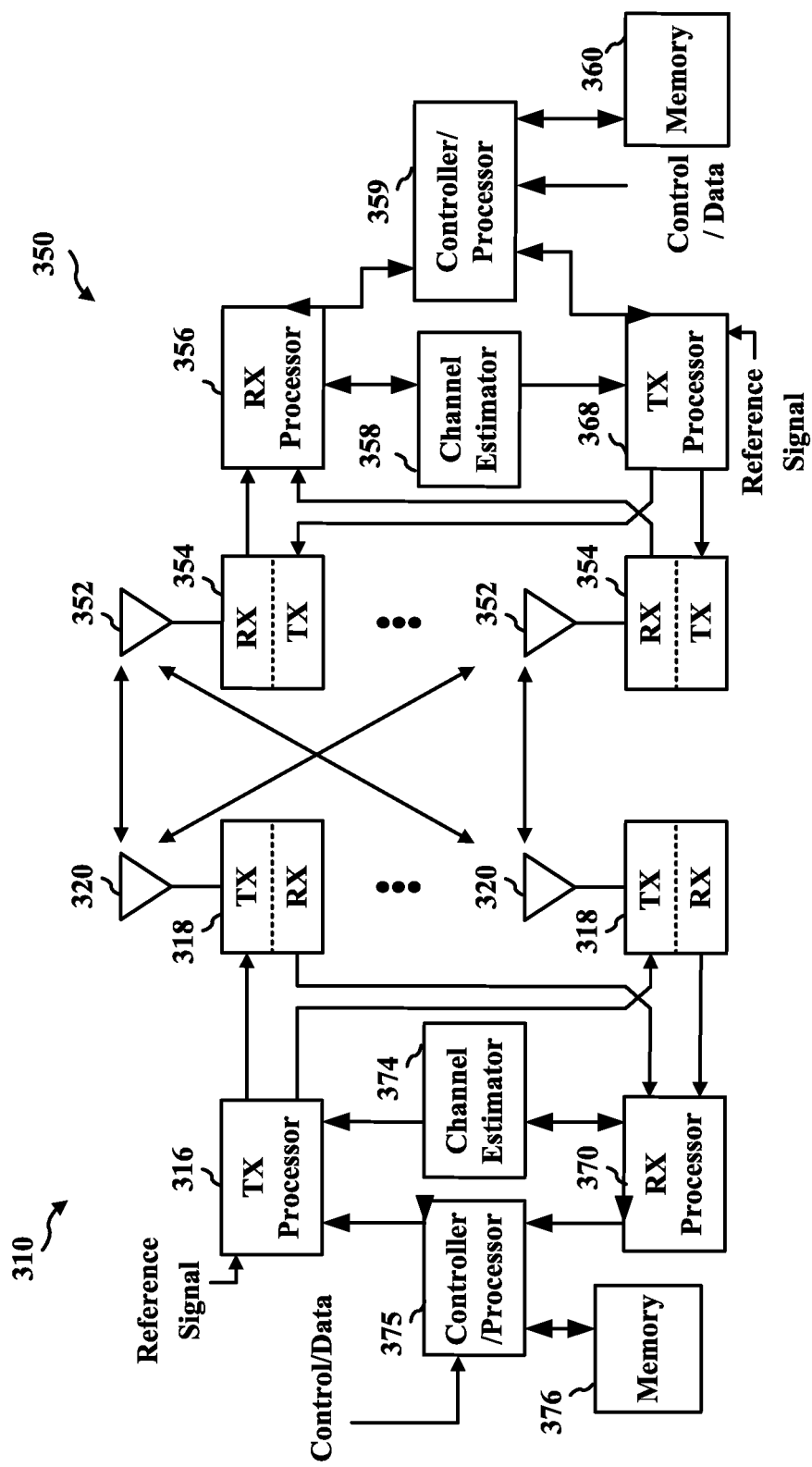
FIG. 3 is a diagram illustrating an example of a base station and a user equipment (UE) that may support D2D channel measurements and/or D2D communication, for example as in the system illustrated in FIG. 1, in accordance with certain aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission. The controller/processor and/or other example components in base station 310 may represent one or more processing units that may be configured to support/implement certain D2D channel measurement and communication techniques as provided herein.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 may be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations. The controller/processor and/or other example components in UE 350 may represent one or more processing units that may be configured to support/implement certain D2D channel measurement and communication techniques as provided herein.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 may be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 may also be responsible for error detection using an ACK and/or NACK protocol to support HARQ operations.

Figure 4:
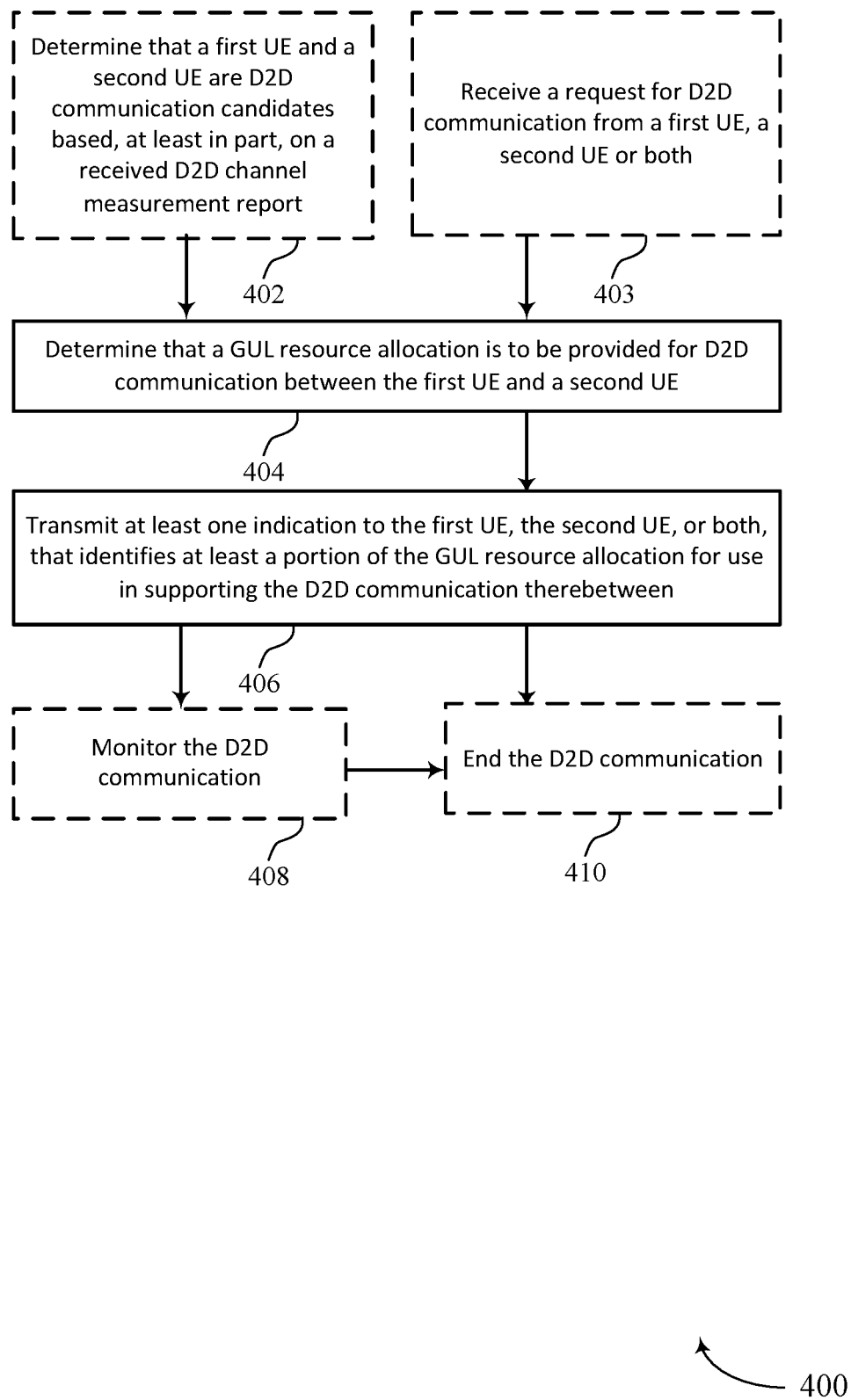
FIG. 4 is a flow diagram illustrating an example method for use by a base station to support D2D communication between two UEs, in accordance with certain aspects of the present disclosure.

FIG. 4 is a flow diagram illustrating an example method 400 for use at a base station, in accordance with certain aspects of the present disclosure. Blocks shown in dashed lines are intended to be optional in certain implementations. Thus, for example, blocks 402, 403, 408, and 410 in example method 400 may be individually optional, while blocks 404 and 406 may represent a complete example method 400 in certain implementations.

With this in mind, at example block 402, a base station may determine whether a first UE and a second UE are D2D communication candidates. For example, such a determination by the base station may consider, at least in part, one or more D2D channel measurements that may be provided in one or more reports from one or more UEs. By way of example, in certain implementations, a D2D channel measurement may comprise a received signal strength measurement, or some other like signal parameter that may be useful in determining if a D2D communication may be possible between the first UE and the second UE. In certain instances, a base station may also determine that a first UE and a second UE may be indicated as being within a threshold communication proximity of one another. For example, if the base station is serving both UEs it may be determined that the UEs are indicated as being within a threshold communication proximity of one another. In other example, if a location (e.g., coordinates, ranges, or the like) for each UE is known or estimated, a comparison of such may indicate that the two UEs may be within a threshold communication proximity of one another. In yet another example, one or both UEs may indicate to the base station that the other UE may be within a threshold communication proximity. By way of example, a UE may be configured to make D2D channel measurements based on SRS or other like transmissions from the other UE. In a similar manner, at example block 403, a base station may receive a request for D2D communication from the first UE, the second UE, or both. Such a request(s) may inform, at least in part, a determination made by the base station as at block 402, or may otherwise be indicative that the first UE and second UE are already deemed to be D2D communication candidates. With such a decision made, a possible result as illustrated in FIG. 4 of either example (optional) blocks 402 and/or 403 may be that method 400 proceeds at block 404.

At example block 404, a base station may determine that a GUL resource allocation is to be provided for D2D communication between a first UE and a second UE. By way of example, a first GUL resource allocation may be provided to the first UE and a second GUL resource allocation may be provided to the second UE. In some instances, such a GUL resource allocation may comprise, at least in part, one or more previously arranged GUL resource allocations for a given UE, while in other instances such a GUL resource allocation may be new/different. In certain implementations, a GUL resource allocation determination at block 404 may consider, at least in part, various network condition(s), D2D channel measurement(s), report(s) from UE(s), D2D communication request(s) from UE(s), a type of a UE, a service or other like capability associated with an UE or user thereof, a time of day or date, potential wireless interference considerations, a quality of service associated with the D2D communication, and/or the like or some combination thereof, just to name a few examples.

At example block 406, the base station may transmit at least one indication to the first UE, the second UE or both, that identifies at least a portion of a GUL resource allocation for use in supporting the D2D communication between the first UE and the second UE, e.g., as determined at block 404. An indication to a UE at block 406 may indicate, at least in part, one or more wireless signaling parameters for use in supporting at least a portion of a D2D communication. For example, an indication may inform a first UE that it is to support a D2D communication with the second UE by transmitting D2D signals over first GUL resources and receiving D2D signals from the second UE over second GUL resources. Similarly, for example, an indication may inform a second UE that it is to support a D2D communication with the first UE by transmitting D2D signals over second GUL resources and receiving D2D signals from the first UE over first GUL resources. As such, an indication in accordance with example block 406 may comprise or otherwise correspond to a time-related parameter, a frequency-related parameter, a spatial-related parameter, a resource block related parameter, a carrier-related parameter, a transmitter-related parameter, a transmit power-related parameter, and/or the like or some combination thereof, just to name a few examples. As a result of block 406, a D2D communication between the first UE and the second UE will be set-up and may proceed accordingly.

At example block 408, which may be optional, the base station may monitor D2D communication (e.g., as set-up via block 406) between a first UE and a second UE. Thus, for example, a base station may actively monitor some or all of the signals transmitted via the D2D communication between the first UE, the second UE or both. In one example, a base station may monitor D2D communication signals to determine whether the GUL resource allocation(s) are adequate, being efficiently used, etc. In a specific example, a base station may monitor D2D communication traffic and/or "keep-alive" signals, at least in part, to determine if the D2D communication should continue, or be altered in some manner. In certain example implementations, a base station may monitor the D2D communication, at least in part, by receiving one or more UE-to-base station reports/requests corresponding to an on-going (possibly problematic) D2D communication, signaling environment (e.g., link quality, D2D channel measurement, etc.), a change in UE/communication needs, etc.

At example block 410, which may be optional, a base station may determine that a D2D communication as set-up at block 406 is to end. In certain instances, a base station may end a D2D communication by altering one or more GUL resource allocations as determined a block 404 and informing the affected UE(s). In certain instances, at block 410 a base station may provide indirect communication between the UEs that were involved in the D2D communication. In certain implementations, a D2D communication may be set to end at block 410 based on one or more events. For example, a need to change GUL resource allocation(s), a loss of D2D signaling, a passage of a period of time, a lack of keep-alive signals, etc., may represent events that may trigger, at least in part, the end of a D2D communication in accordance with block 410. As illustrated in FIG. 4, example method 400 may proceed to block 410 from block 406 or possible block 408.

In certain example implementations, at blocks 408 and/or 410 or elsewhere applicable, method 400 may permit a base station to handover one or both UEs to another base station. In certain instances, such a handover may comprise ending the D2D communication as set-up at block 406. In certain instances, a handover may be configured to maintain all or part of an on-going or scheduled D2D communication, e.g., wherein monitoring of the D2D communication may also be transferred to the target base station in some manner, e.g., as part of a handover, etc. In certain implementations, indirect communication between the UEs involved in the D2D communication may be re-routed via a first base station and a second base station. Some example signals that may support all or part of method 400 and method 500 (presented below) are also further described and illustrated in an example call-flow 800 in FIG. 8.

Figure 5:
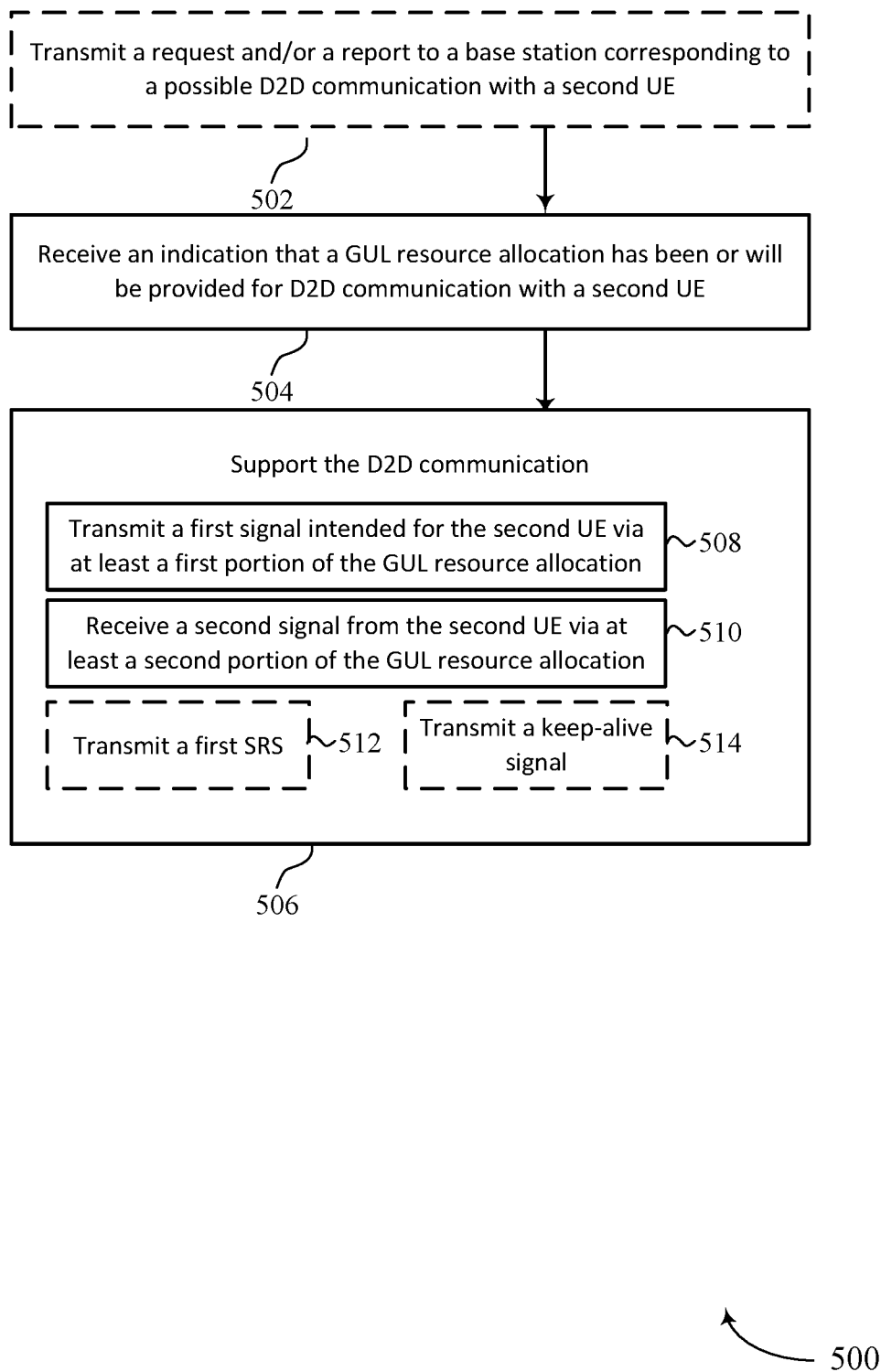
FIG. 5 is a flow diagram illustrating an example method for use by a UE to support D2D communication with another UE, in accordance with certain aspects of the present disclosure.

Attention is drawn next to FIG. 5, which is a flow diagram illustrating an example method 500 for use by a UE, in accordance with certain aspects of the present disclosure. Blocks shown in dashed lines are intended to be optional in certain implementations. Thus, for example, blocks 502, 512 and 514 in example method 500 may be individually optional, while blocks 504 and 506 (including blocks 508 and 510) may represent a complete example method 500 in certain implementations.

With this in mind, at example (optional) block 502, a (first) UE may transmit to a base station, a request for a D2D communication, a report corresponding to D2D channel measurement, and/or the like which may be considered, at least in part, by the base station in possibly setting up a D2D communication between the first UE and another (second) UE. Such a request, report, etc., may be transmitted, for example, via an existing/previous GUL resource allocation in certain instances.

At example block 504, the first UE may receive an indication that a GUL resource allocation has been or will be provided for use in D2D communication between the first UE and a second UE. As mentioned with regard to example method 400 (e.g., at block 406), in certain instances a base station may transmit at least one indication to the first UE, the second UE or both, that identifies at least a portion of a GUL resource allocation for use in supporting the D2D communication between the first UE and the second UE. Thus, in the present example, an indication to the first UE at block 504 may indicate, at least in part, various wireless signaling parameters for use in providing at least a portion of the D2D communication. For example, an indication may inform the first UE that it is to support a D2D communication with the second UE by transmitting D2D signals over first GUL resources and receiving D2D signals from the second UE over second GUL resources. As such, an indication in accordance with example block 504 may comprise or otherwise correspond to a time-related parameter, a frequency-related parameter, a spatial-related parameter, a resource block related parameter, a carrier-related parameter, a transmitter-related parameter, a transmit power-related parameter, and/or the like or some combination thereof, just to name a few examples.

At example block 506, the first UE may be configured to support the D2D communication as indicated at block 504. Here, for example, at block 508 to support the D2D communication the first UE may transmit at least a first signal intended for the second UE via at least a first portion of the GUL resource allocation as may be indicated at block 504. Similarly, at block 510 to support the D2D communication the first UE may receive at least a second signal intended for the first UE via at least a second portion of the GUL resource allocation as may be indicated at block 504. In certain further implementations, at (optional) block 512, the first UE may support the D2D communication, at least in part, by transmitted a first SRS that may be used by the base station, the second UE, or both for possible channel measurements that may indicate whether the D2D communication or other wireless communication with the first UE should be continued, altered in some manner, or possibly ended. Such a first SRS may be transmitted via previously allocated GUL resources and/or via at least a portion of the GUL resource allocation associated with the D2D communication.

In another example implementation, at (optional) block 514, one or more keep-alive signals may be transmitted via the D2D communication with the intended purpose of supporting/maintaining the D2D communication, e.g., possibly in an absence/delay of other D2D traffic. Here, for example, such a keep-alive signal may be received by the second UE and/or the base station, one or both of which may continue to support the D2D communication in consideration of the keep-alive signal from the first UE. In a similar manner, it should also be understood that the UEs and/or base station involved in setting-up and supporting the D2D communication may also monitor, as applicable, ACK/NACK signals and/or the like that may inform a decision to maintain, alter or possibly end a D2D communication. Thus, for example, if a threshold number of NACKs or lack thereof over some period of time is reached, a decision may be made by a UE to transmit a request, a report or the like to the base station to affect a possible change or end to the D2D communication. Similarly, if the base station is monitoring the D2D communication, then the base station may change the D2D communication in some manner, e.g., end it, re-allocate GUL resources, handover one or both UEs to another base station, etc., in response to such a request or report, and/or by monitoring the D2D communication.

The example methods 400 and 500 illustrate techniques by which conditions of channel quality may be measured and considered in determining if UEs may be D2D communication candidates. Some of the examples presented herein make use of SRS transmissions for D2D channel measurements; however, other transmissions may also be measured using such techniques. By way of example, in the LTE uplink another potential reference signal that may be monitored is a demodulation reference signal (DM-RS) which is UE-specific because it is located in the middle of a PUSCH signal.

To determine whether the transmissions between various UEs may be switched to D2D based on the quality of the channel between them, a base station may instruct the UEs to take channel measurements via SRS transmissions in a distributed fashion. Channel quality may be an important factor in determining whether a channel may be used, possibly more so than the distance between UEs. However, switching communication to D2D communication may result in additional interference to neighboring devices. Such a cost may also be weighed against the improvement in efficiency when determining whether to switch to D2D communication or not. Note that even after the D2D setup, such as part of an example D2D support process, a base station may monitor the D2D communication performance (e.g. RF and latency) because UEs may move with respect to each other, and if needed, the base station may decide to end the D2D communication and possibly switch to an indirect transmission route between the two UEs.

In one example, an existing UL SRS may be utilized to measure channel conditions. In MuLTEfire, a UE, on request from an gNB, may send a UL SRS aperiodically either in a PUCCH as part of an S subframe, or along with a PUSCH. Special subframes are used in TDD mode for switching from downlink to uplink. Such subframes may include GP, UpPTS and DwPTS sections, wherein the GP section comprises a guard period between UpPTS and DwPTS sections. Here, a UpPTS comprises an Uplink Pilot Time Slot. Such an UpPTS may not include a PUCCH or a PUSCH, but may include a PRACH and SRS. Such a DwPTS comprises a Downlink Pilot Time Slot which may include a P-SS. Based on base station indicative scheduling, an SRS may be transmitted once, periodically, or aperiodically. The subframes including such SRS transmissions that may be available may be indicated along with SRS bandwidths by the UE specific or cell specific configurations supplied by the gNB. Such a configuration may indicate frequency domain and time domain resources the UE may use. The subframe where an SRS transmission occurs is an example of a time domain resource. To enable a D2D measurement for use in determining, for example, a channel quality between two UEs, as presented herein the base station may request a monitored UE to transmit aperiodic SRS in upcoming short PUCCHs (sPUCCHs), or if the monitored UE is already sending UL traffic, to send the SRS with a physical uplink shared channel (PUSCH). Here, for example, a sPUCCH may comprise a PUCCH for standalone operation in unlicensed spectrum. A gNB may request that the monitoring UE monitor an SRS transmission from a monitored UE in an upcoming sPUCCH/PUSCH transmissions, and provide a corresponding report of such to the gNB.

Figure 6:
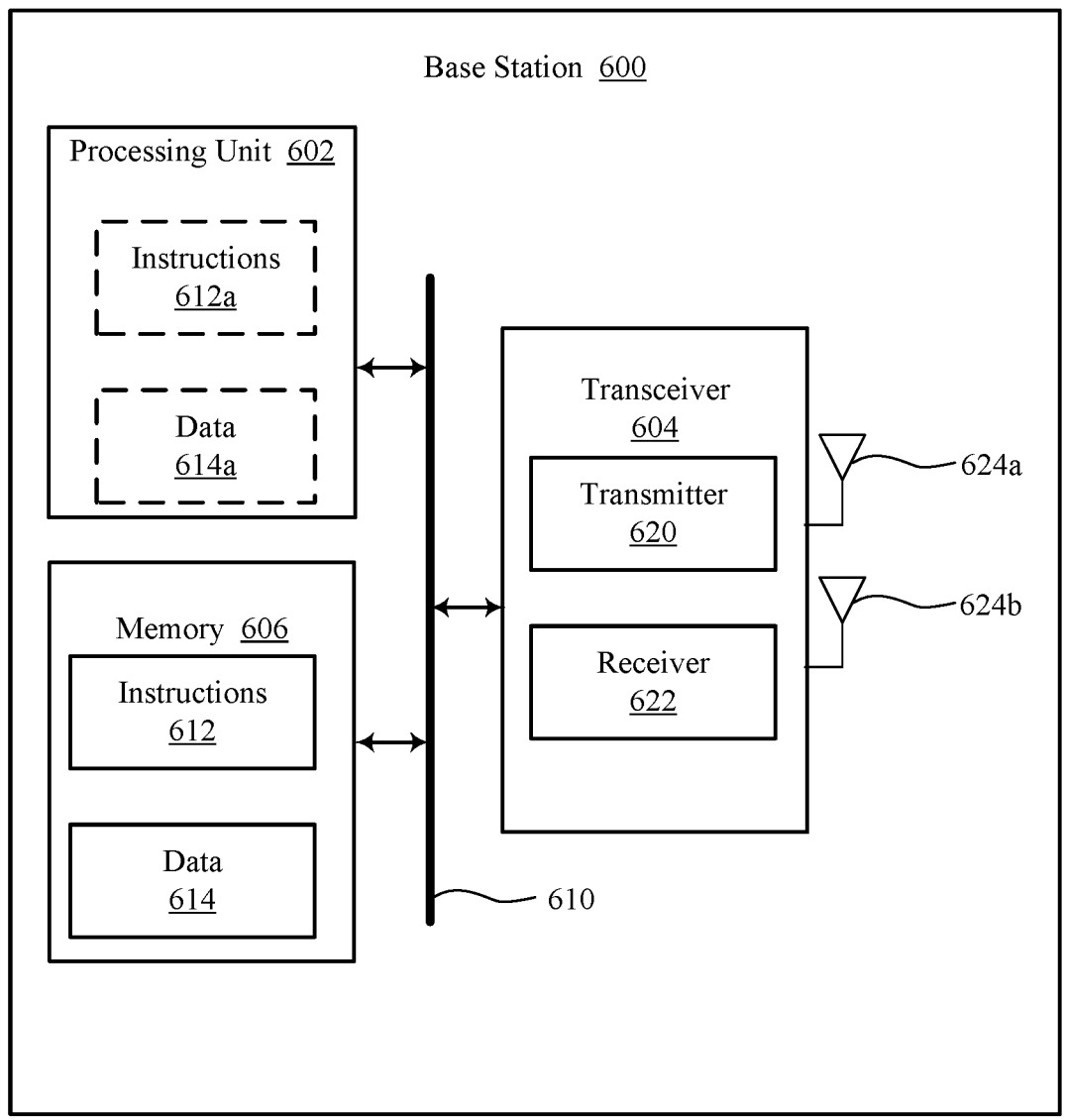
FIG. 6 is a diagram illustrating some example components that may be included within a base station, in accordance with certain aspects of the present disclosure.

Attention is drawn next to FIG. 6, which is a block diagram illustrating some example components that may be included within a base station 600.

In certain example implementations, base station 600 may comprise or otherwise represent an access point, a NodeB, an evolved NodeB, etc. Base station 600 includes a processing unit 602. The processing unit 602 may be a general-purpose single- or multi-chip microprocessor (e.g., an ARM), a special purpose microprocessor (e.g., a digital signal processor (DSP)), a microcontroller, a programmable gate array, etc. The processing unit 602 may be referred to as a central processing unit (CPU). Although just a single processing unit 602 is shown in the base station 600 of FIG. 6, in an alternative configuration, a combination of processors (e.g., an ARM and DSP) could be used.

Base station 600 may also include memory 606. The memory 606 may be any electronic component capable of storing electronic information. The memory 606 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof. As illustrated, at times, data 614 and/or instructions 612 may be stored in memory 606. Instructions 612 may be executable by processing unit 602, e.g., to implement, at least in part, techniques disclosed herein. Executing instructions 612 may involve the use of data 614 that may be stored in memory 606. When processing unit 602 executes instructions 1609, various portions of instructions 612a may be loaded onto processing unit 602, and various pieces of data 614a may be loaded onto processing unit 602.

Base station 600 may also include a transmitter 620 and a receiver 622 to allow transmission and reception of wireless signals, e.g., to and from one or more UEs (not shown). Transmitter 620 and receiver 622 may be collectively referred to as a transceiver 604. One or more antennas 624a-b may be electrically coupled to the transceiver 604. Base station 600 may also include (not shown) multiple transmitters, multiple receivers and/or multiple transceivers.

The various components of base station 600 may be coupled together by one or more buses or the like, e.g., which may include a power bus, a control signal bus, a status signal bus, a data bus, etc. For the sake of clarity, the various buses are represented in FIG. 6 as a bus 610.

Figure 7:
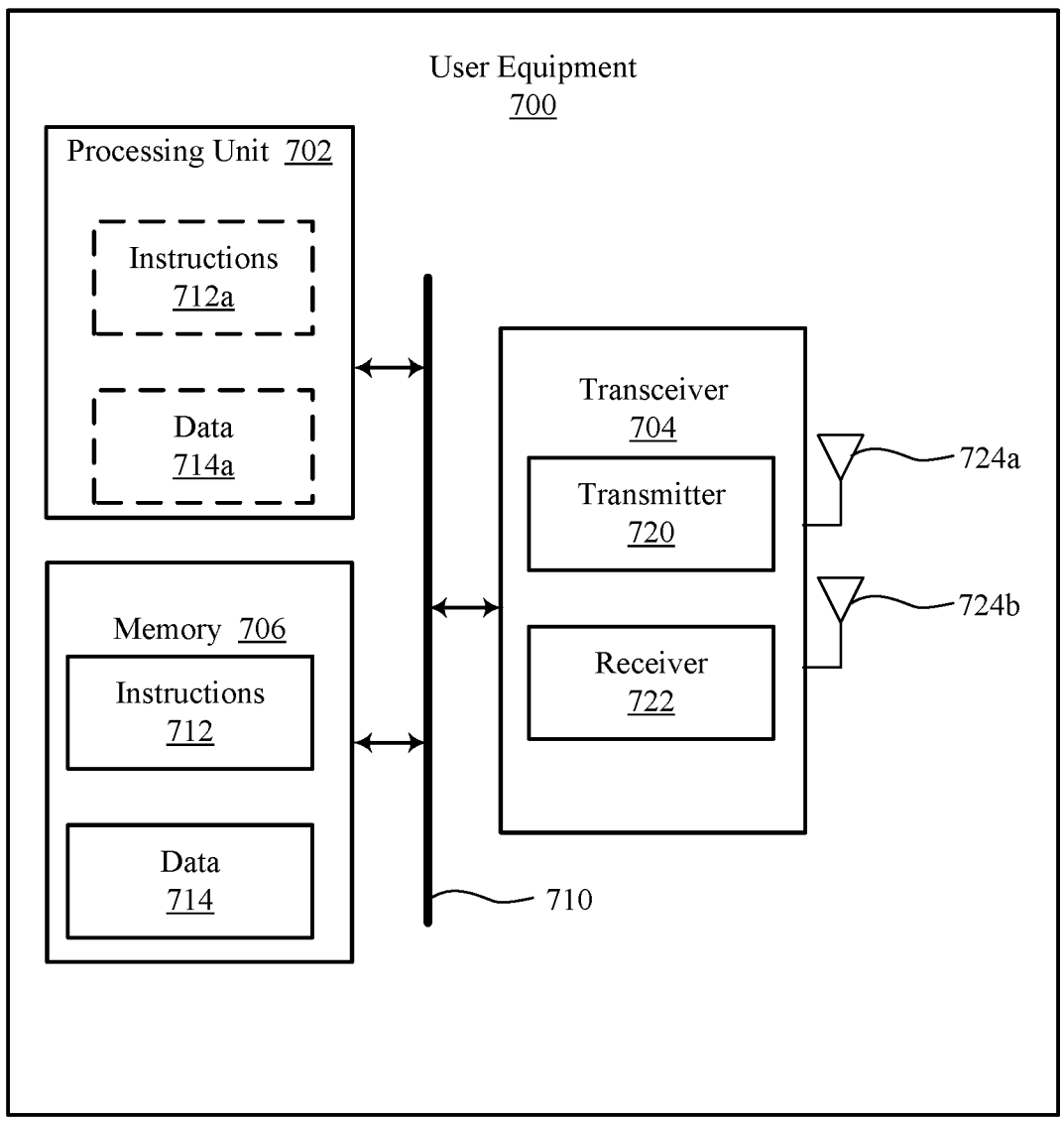
FIG. 7 is a diagram illustrating some example components that may be included within a UE, in accordance with certain aspects of the present disclosure.

FIG. 7 is a block diagram illustrating some example components that may be included within a UE 700.

UE 700 may comprise a processing unit 702. Processing unit 702 may be a general-purpose single- or multi-chip microprocessor (e.g., an ARM), a special purpose microprocessor (e.g., a digital signal processor (DSP)), a microcontroller, a programmable gate array, etc. Processing unit 702 may be referred to as a central processing unit (CPU). Although just a single processing unit 702 is shown in the wireless communication device 700 of FIG. 12, in an alternative configuration, a combination of processors (e.g., an ARM and DSP) could be used.

UE 700 may also include memory 706. Memory 706 may be any electronic component capable of storing electronic information. Memory 706 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

As illustrated, at times, data 714 and/or instructions 712 may be stored in memory 706. Instructions 712 may be executable by processing unit 702 to implement the techniques disclosed herein. Executing instructions 712 may involve the use of the data 714 that may be stored in memory 706. When processing unit 702 executes instructions 1709, various portions of instructions 712a may be loaded onto the processing unit 702, and various pieces of data 714a may be loaded onto processing unit 702.

UE 700 may also include a transmitter 720 and a receiver 722 to allow transmission and reception of wireless signals to and from other devices (not shown). Transmitter 720 and receiver 722 may be collectively referred to as a transceiver 704. One or more antennas 724a-b may be electrically coupled to transceiver 704. UE 700 may also include (not shown) multiple transmitters, multiple receivers and/or multiple transceivers.

The various components of UE 700 may be coupled together by one or more buses or the like, which may include a power bus, a control signal bus, a status signal bus, a data bus, etc. For the sake of clarity, the various buses are illustrated in FIG. 7 as a bus 710. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Figure 8:
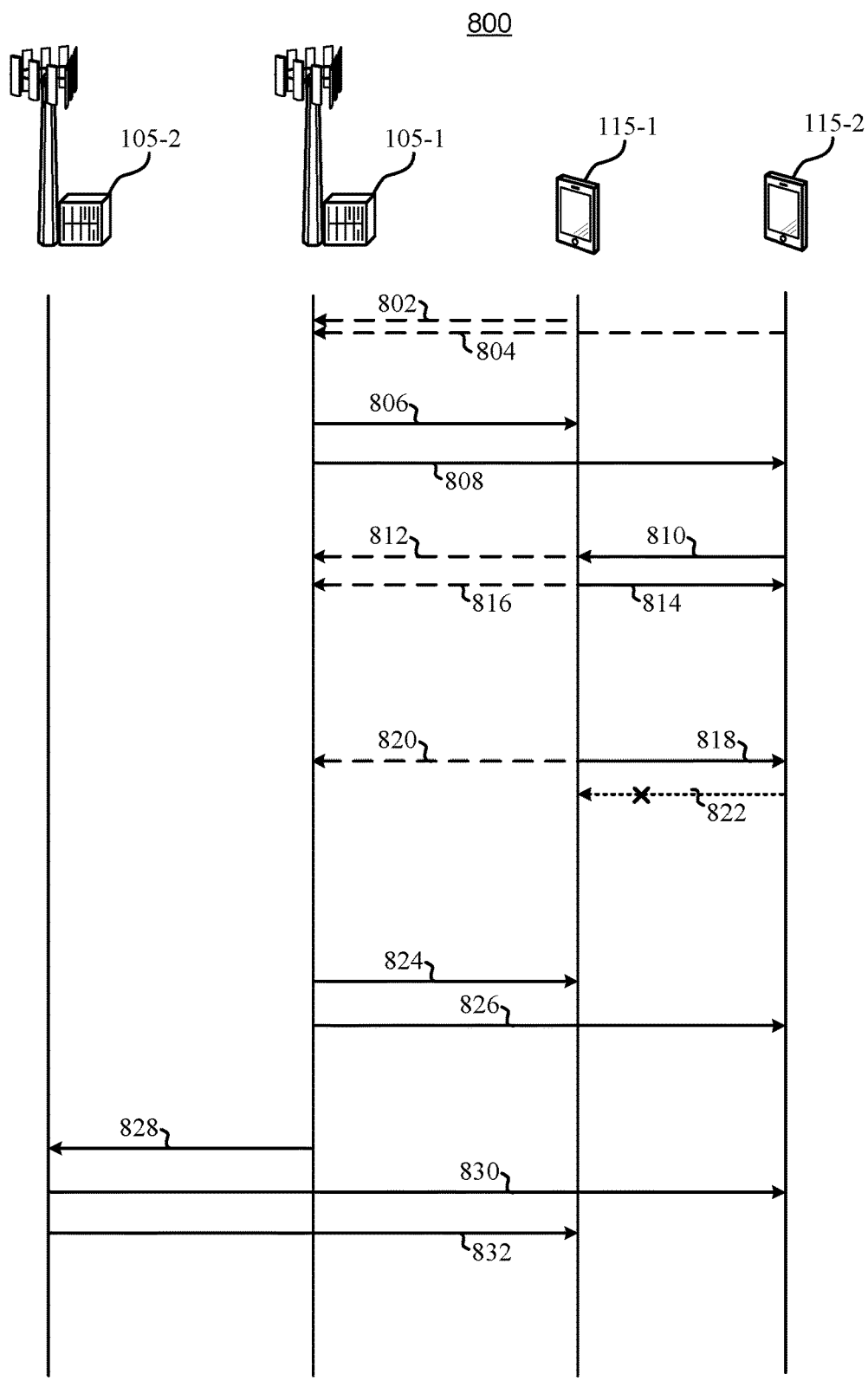
FIG. 8 is a call flow diagram illustrating some example message exchanges that may be used, at least in part, to implement D2D communication techniques in accordance with certain aspects of the present disclosure

Attention is drawn next to FIG. 8, which includes an example call-flow 800 that may be implemented, at least in part, by techniques provided herein to allow for D2D communication between a first UE 115-1 and a second UE 115-2. As illustrated in call flow 800, in addition to the UEs, a first base station 105-1 and a second base station 105-2 are also included. In this example, the first base station 105-1 sets-up the D2D communication and there is an example handover to second base station 105-2.

Signals 802 and 804 may represent one or more reports, requests, or other like indications that may be transmitted from first UE 115-1 and UE 115-2, respectively, to first base station 105-1, and which may be considered, at least in part, by first base station 105-1 to determine whether a D2D communication is to be set-up. By way of some examples, reference is made to method 400 at block 403, and method 500 at block 502.

Signals 806 and 808 are shown as transmitted by first base station 105-1 to first UE 115-1 and second UE 115-2, respectively, and may represent one or more indications that a D2D communication is or will be set-up between the two UEs. Signals 806 and 808 may identify at least a portion of GUL resource allocation associated with the D2D communication. By way of some examples, reference is made to method 400 at blocks 404 and 406, and method 500 at block 504. It should be understood, that while separate signals may be illustrated for both UEs, in certain implementations a shared/common signal may serve such purposes.

As part of a D2D communication, second UE 115-2 may transmit signal 810 to first UE 115-1, and receive signal 814 from first UE 115-1. In this manner, for example, first UE 115-1 and second UE 115-12 may support, at least in part, the D2D communication. By way of example, reference is made to method 500 at block 506. Also, as illustrated, signal 810 from second UE 115-2 may be received by first base station 105-1, as represented by signal 812. Similarly, signal 814 from first UE 115-2 may be received by first base station 105-1, as represented by signal 816. In this manner, for example, first base station 105-1 may support or otherwise monitor, at least in part, the D2D communication. By way of example, reference is made to method 400 at block 408.

By way of further illustrative example, a signal 818 is shown as being transmitted by first UE 115-1 to second UE 115-2 as part of the D2D communication and represents at least one keep-alive message. By way of example, reference is made to method 500 at block 514. As further illustrated such keep-alive message may also be received by first base station 105-1 as represented by signal 820. By way of example, reference is made to method 400 at block 408 wherein the base station may monitor all or part of the D2D communication. In another example, signal 818/820 may represent an ACK or NACK, e.g., as part of a HARQ process or the like.

Dashed line 822 is intended to represent some signal that may normally be expected to be received from second UE 115-2 as part of the D2D communication, but for some reason has not been received by first UE 115-1 as further illustrated by the crossed-out section. By way of example, "missing" signal 822 may have been an expected traffic message, an ACK/NACK message, a keep-alive message, etc. Signal 822 may be "missing" for any number of reasons, e.g., it was not transmitted, it was attenuated, etc. Although not illustrated in FIG. 8, it is also assumed that signal 822 was also not received by first base station 105-1 or second base station 105-2. In certain implementations presented herein, the D2D communication may possibly be changed or ended, based, at least in part, on a lack of signal 822 transmission/reception. By way of example, reference is made to method 400 at blocks 408 and 410, and method 500 at blocks 506 and 514.

As previously mentioned, a D2D communication may need to be affected in some manner, e.g., changed, ended, handed-off, etc. An example of one type of change may be represented by signals 824 and/or 826 by which first base station 105-1 may indicate to first UE 115-1 and second UE 115-2, respectively, a change effecting a D2D communication. By way of example, reference is made to method 400 at blocks 408 and 410. Here, for example, new/different GUL resource allocation(s) may be indicated, or an end to the D2D communication may be indicated. In another example, signal(s) 824 and/or 826 may represent indirect signaling supportive of an on-going D2D communication.

Another example change may be represented by signal 828 by which first base station 105-1 may indicate to second base station 105-2 that first UE 115-1, second UE 115-2 or both may be handed-off. By way of example, reference is made to method 400 at blocks 408 and 410. Here, for example, in some instances the D2D communication may be ended as a result of a handoff. In other instances, the D2D communication may continue in whole or in part following handoff. Signals 830 and 832 may, for example, represent potential changes to or maintenance of a D2D communication as a result of some handoff from first base station 105-1 to second base station 105-2.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for use at a first user equipment (UE), the method comprising, at the first UE:
   measuring a Device-to-Device (D2D) channel to obtain a D2D channel measurement;
   determining whether to transmit a request for D2D communication based on the D2D channel measurement;
   transmitting the request for D2D communication based, at least in part, on the determining whether to transmit the request;
   receiving, from a base station in response to the request, an indication that a Grant-free Uplink (GUL) resource allocation has been or will be provided for the D2D communication between the first UE and a second UE; and
   supporting the D2D communication by:
      transmitting a first signal intended for the second UE via at least a first portion of the GUL resource allocation, and
      receiving a second signal from the second UE via at least a second portion of the GUL resource allocation.

2. The method as recited in claim 1, wherein:
   the first portion of the GUL resource allocation and the second portion of the GUL resource allocation comprise the same GUL resource allocation; or
   the first portion of the GUL resource allocation comprises at least a portion of a previous GUL resource allocation provided for the first UE to transmit signals intended for the base station.

3. The method as recited in claim 1,
   wherein measuring the D2D channel comprises measuring a Sounding Reference Signal (SRS) transmission by the second UE.

4. A method for use at a first user equipment (UE), the method comprising, at the first UE:
   receiving, from a base station, an indication that a Grant-free Uplink (GUL) resource allocation has been or will be provided a Device-to-Device (D2D) communication between the first UE and a second UE; and
   supporting the D2D communication by:
      transmitting a first signal intended for the second UE via at least a first portion of the GUL resource allocation, and
      receiving a second signal from the second UE via at least a second portion of the GUL resource allocation; and
   wherein supporting the D2D communication further comprises, at the first UE:
      transmitting a first Sounding Reference Signal (SRS), wherein the first SRS is transmitted by the first UE via at least a first portion of the GUL resource allocation, and the first portion of the GUL resource allocation is different from a previous GUL resource allocation provided for the first UE to transmit signals intended for the base station;
      transmitting at least one keep-alive signal to maintain the D2D communication;
      or both.

5. The method as recited in claim 1, wherein the GUL resource allocation is provided as part of a MuLTEfire framework.

6. A first user equipment (UE), the first UE comprising:
   a receiver;
   a transmitter; and
   a processing unit coupled to the receiver and the transmitter and configured to:
      measure a Device-to-Device (D2D) channel to obtain a D2D channel measurement;
      determine whether to transmit a request for D2D communication based on the D2D channel measurement;
      transmit the request for D2D communication based, at least in part, on the determining whether to transmit the request;
      obtain, in response to the request and from a base station via the receiver, an indication that a Grant-free Uplink (GUL) resource allocation has been or will be provided for the D2D communication between the first UE and a second UE; and
      in support of the D2D communication:
         initiate transmission, via the transmitter, of a first signal intended for the second UE via at least a first portion of the GUL resource allocation, and
         obtain, via the receiver, a second signal from the second UE via at least a second portion of the GUL resource allocation.

7. The first UE as recited in claim 6, wherein:
   the first portion of the GUL resource allocation and the second portion of the GUL resource allocation comprise the same GUL resource allocation; or
   the first portion of the GUL resource allocation comprises at least a portion of a previous GUL resource allocation provided for the first UE to transmit signals intended for the base station.

8. The first UE as recited in claim 6, wherein the processing unit is further configured to:
   measure a Sounding Reference Signal (SRS) transmission by the second UE in measuring the D2D channel.

9. The first UE as recited in claim 6, wherein in support of the D2D communication the processing unit is further configured to:
   initiate transmission, via the transmitter, of a first Sounding Reference Signal (SRS);
   initiate transmission, via the transmitter, of at least one keep-alive signal to maintain the D2D communication;
   or both.

10. A first user equipment (UE), the first UE comprising:
    a receiver;
    a transmitter; and
    a processing unit coupled to the receiver and the transmitter and configured to:
       obtain, in response to the request and from a base station via the receiver, an indication that a Grant-free Uplink (GUL) resource allocation has been or will be provided for a Device-to-Device (D2D) communication between the first UE and a second UE; and in support of the D2D communication:
initiate transmission, via the transmitter, of a first signal intended for the second UE via at least a first portion of the GUL resource allocation, and
obtain, via the receiver, a second signal from the second UE via at least a second portion of the GUL resource allocation;

wherein in support of the D2D communication the processing unit is further configured to:
initiate transmission, via the transmitter, of a first Sounding Reference Signal (SRS), wherein the first SRS is transmitted by the first UE via at least a first portion of the GUL resource allocation, and the first portion of the GUL resource allocation is different from a previous GUL resource allocation provided for the first UE to transmit signals intended for the base station;
initiate transmission, via the transmitter, of at least one keep-alive signal to maintain the D2D communication;
or both.

11. The first UE as recited in claim 6, wherein the GUL resource allocation is provided as part of a MuLTEfire framework.

12. A method for use at a base station, the method comprising, at the base station:
determining that a Grant-free Uplink (GUL) resource allocation is to be provided for Device-to-Device (D2D) communication between a first UE and a second UE;
transmitting at least one indication to the first UE, the second UE, or both, wherein the at least one indication identifies at least a portion of the GUL resource allocation for use by the first UE, the second UE, or both in supporting the D2D communication therebetween; and
receiving a first signal via at least a first portion of the GUL resource allocation and a second signal via at least a second portion of the GUL resource allocation, the first signal being transmitted from the first UE to the second UE and the second signal being transmitted by the second UE to the first UE as part of the D2D communication.

13. The method as recited in claim 12, wherein the first portion of the GUL resource allocation and the second portion of the GUL resource allocation comprise the same GUL resource allocation.

14. The method as recited in claim 12, wherein the first portion of the GUL resource allocation comprises at least a portion of a previous GUL resource allocation provided for the first UE to transmit signals intended for the base station.

15. The method as recited in claim 12, wherein the first signal, the second signal, or both comprise a keep-alive signal intended to maintain the D2D communication.

16. The method as recited in claim 12, and further comprising, at the base station:
ending the D2D communication based, at least in part, on a D2D channel measurement threshold parameter, a UE SRS threshold parameter, a D2D communication timeout threshold parameter, a D2D communication termination request, a base station handover determination, a GUL resource reallocation determination, or some combination thereof.

17. The method as recited in claim 12, and further comprising, at the base station:
receiving a request for the D2D communication from the first UE, the second UE or both, and determining that the GUL resource allocation is to be provided for the D2D communication based, at least in part, on the request.

18. The method as recited in claim 12, and further comprising, at the base station:
determining that the first UE and the second UE are D2D communication candidates based, at least in part, on a report received from the first UE indicative of a D2D channel measurement based on a Sounding Reference Signal (SRS) transmission from the second UE.

19. The method as recited in claim 12, wherein the GUL resource allocation is provided as part of a MuLTEfire framework.

20. A base station comprising:
a receiver;
a transmitter; and
a processing unit coupled to the receiver and the transmitter and configured to:
determine that a Grant-free Uplink (GUL) resource allocation is to be provided for Device-to-Device (D2D) communication between a first UE and a second UE;
initiate transmission, via the transmitter, of at least one indication to the first UE, the second UE, or both, wherein the at least one indication identifies at least a portion of the GUL resource allocation for use by the first UE, the second UE, or both in supporting the D2D communication therebetween; and
monitor the D2D communication, at least in part, through the receiver, based in a first signal received via at least a first portion of the GUL resource allocation and a second signal received via at least a second portion of the GUL resource allocation, the first signal being transmitted from the first UE to the second UE and the second signal being transmitted by the second UE to the first UE as part of the D2D communication.

21. The base station as recited in claim 20, wherein:
the first portion of the GUL resource allocation and the second portion of the GUL resource allocation comprise the same GUL resource allocation;
the first portion of the GUL resource allocation comprises at least a portion of a previous GUL resource allocation provided for the first UE to transmit signals intended for the base station;
the first signal, the second signal, or both comprise a keep-alive signal intended to maintain the D2D communication
or some combination thereof.

22. The base station as recited in claim 20, wherein the processing unit is further configured to:
end the D2D communication based, at least in part, on a D2D channel measurement threshold parameter, a UE SRS threshold parameter, a D2D communication timeout threshold parameter, a D2D communication termination request, a base station handover determination, a GUL resource reallocation determination, or some combination thereof.

23. The base station as recited in claim 20, wherein the processing unit is further configured to:
obtain, via the receiver, a request for the D2D communication from the first UE, the second UE or both; and determine that the GUL resource allocation is to be provided for the D2D communication based, at least in part, on the request.

24. The base station as recited in claim 20, wherein the processing unit is further configured to:
determine that the first UE and the second UE are D2D communication candidates based, at least in part, on a report obtained, via the receiver, from the first UE indicative of a D2D channel measurement of a D2D channel measurement based on a Sounding Reference Signal (SRS) transmission from the second UE.

25. The base station as recited in claim 20, wherein the GUL resource allocation is provided as part of a MuLTEfire framework.

* * * * *